(12) United States Patent
Kimura et al.

(10) Patent No.: US 9,464,430 B2
(45) Date of Patent: Oct. 11, 2016

(54) VACUUM INSULATION MATERIAL

(71) Applicant: SAMSUNG ELECTRONICS CO., LTD., Suwon-si, Gyeonggi-do (KR)

(72) Inventors: Mitsuharu Kimura, Yokohama (JP); Hideki Imamura, Yokohama (JP); Kenichi Nagayama, Yokohama (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 14 days.

(21) Appl. No.: 14/521,663

(22) Filed: Oct. 23, 2014

(65) Prior Publication Data

US 2015/0118435 A1 Apr. 30, 2015

(30) Foreign Application Priority Data

Oct. 24, 2013 (JP) .................................. 2013-221378

(51) Int. Cl.
| | |
|---|---|
| *F16L 59/065* | (2006.01) |
| *E04B 1/80* | (2006.01) |
| *B32B 37/18* | (2006.01) |
| *B32B 38/00* | (2006.01) |

(52) U.S. Cl.
CPC ............... *E04B 1/803* (2013.01); *B32B 37/18* (2013.01); *B32B 2038/0092* (2013.01); *B32B 2305/022* (2013.01); *B32B 2307/304* (2013.01); *B32B 2309/02* (2013.01); *B32B 2309/105* (2013.01); *F16L 59/065* (2013.01); *F25D 2201/14* (2013.01); *Y02B 80/12* (2013.01); *Y10T 156/10* (2015.01); *Y10T 428/231* (2015.01)

(58) Field of Classification Search
CPC .. Y10T 428/231; F16L 59/065; E04B 1/803; F25D 2201/14
USPC .......................................................... 428/69
See application file for complete search history.

(56) References Cited

U.S. PATENT DOCUMENTS

| | | | |
|---|---|---|---|
| 4,745,015 A | * | 5/1988 | Cheng ..................... B32B 15/08 105/357 |
| 5,095,064 A | | 3/1992 | Fonte et al. |
| 7,988,770 B2 | | 8/2011 | Hashida et al. |
| 8,147,598 B2 | | 4/2012 | Hashida et al. |
| 8,152,901 B2 | | 4/2012 | Hashida et al. |
| 8,282,716 B2 | | 10/2012 | Hashida et al. |
| 8,308,852 B2 | | 11/2012 | Hashida et al. |
| 2012/0037148 A1 | | 2/2012 | Tudor et al. |
| 2014/0127430 A1 | | 5/2014 | Deno et al. |

FOREIGN PATENT DOCUMENTS

| | | |
|---|---|---|
| EP | 0820568 B2 | 3/2003 |
| JP | 63125577 A | 5/1988 |
| JP | 09137889 A | 5/1997 |
| JP | 2011094638 A | 5/2011 |
| JP | 2011208763 A | 10/2011 |
| JP | 2013050122 A | 3/2013 |
| JP | 5377763 B2 | 12/2013 |
| KR | 1020080016875 A | 2/2008 |

OTHER PUBLICATIONS

Tenpierik et al., "Analytical Models for Calculating Thermal Bridge Effects Caused by Thin High Barrier Envelopes around Vacuum Insulation Panels", Journal of Building Physics, vol. 30, No. 3, Jan. 2007, pp. 185-215.

\* cited by examiner

*Primary Examiner* — Alexander Thomas
(74) *Attorney, Agent, or Firm* — Cantor Colburn LLP

(57) ABSTRACT

A vacuum insulation includes a core material and a gas adsorption agent interposed between a first gas barrier material and a second gas barrier material, wherein the first and the second gas barrier materials sealingly enclose the core material and the gas adsorption agent, and wherein at least one of the first and the second gas barrier materials includes a laminate including a copper alloy foil and a polymeric material.

7 Claims, 1 Drawing Sheet

VACUUM INSULATION MATERIAL

RELATED APPLICATIONS

This application claims priority to and the benefit of Japanese Patent Application No. 2013-221378 filed in the Japanese Patent Office on Oct. 24, 2013, and all the benefits accruing therefrom under 35 U.S.C. §119, the entire contents of both which are incorporated herein by reference.

BACKGROUND

1. Field

The present embodiment relates to a vacuum insulation material. Particularly, the present embodiment relates to a vacuum insulation material which is capable of effectively reducing a heat bridge of an exterior material part.

2. Description of the Related Art

A vacuum insulation material is obtained by vacuum-packaging a core material or a gas adsorption agent in a gas barrier exterior material. The vacuum insulation material suppresses thermal conductivity by maintaining a vacuum inside the material. The vacuum insulation material has been used in electrical products such as a freezer, a refrigerator, a warming cabinet, and a vending machine, in buildings as a wall insulation, or the like since it has a low thermal conductivity. Nonetheless, there remains a need for an improved vacuum insulation material.

SUMMARY

Disclosed is a vacuum insulation material including: a core material and a gas adsorption agent interposed between a first gas barrier material and a second gas barrier material, wherein the first and the second gas barrier materials sealingly enclose the core material and the gas adsorption agent, and wherein at least one of the first and the second gas barrier materials includes a laminate including a copper alloy foil and a polymeric material.

Also disclosed is a method of manufacturing a vacuum insulation material, the method including: providing a core material and a gas adsorption agent; providing a first gas barrier material and a second gas barrier material, wherein at least one of the first and the second gas barrier materials includes a laminate including a copper alloy foil and a polymeric material, and wherein the copper alloy foil is a product of laminating a metal on at least one side of a copper foil or laminating copper on at least one side of a metal foil, and then alloying the same by heat-treatment; and forming a seal with the first gas barrier material and the second gas barrier material to sealingly enclose the core material and the gas adsorption agent between the first gas barrier material and the second gas barrier material to manufacture the vacuum insulation material.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1A:
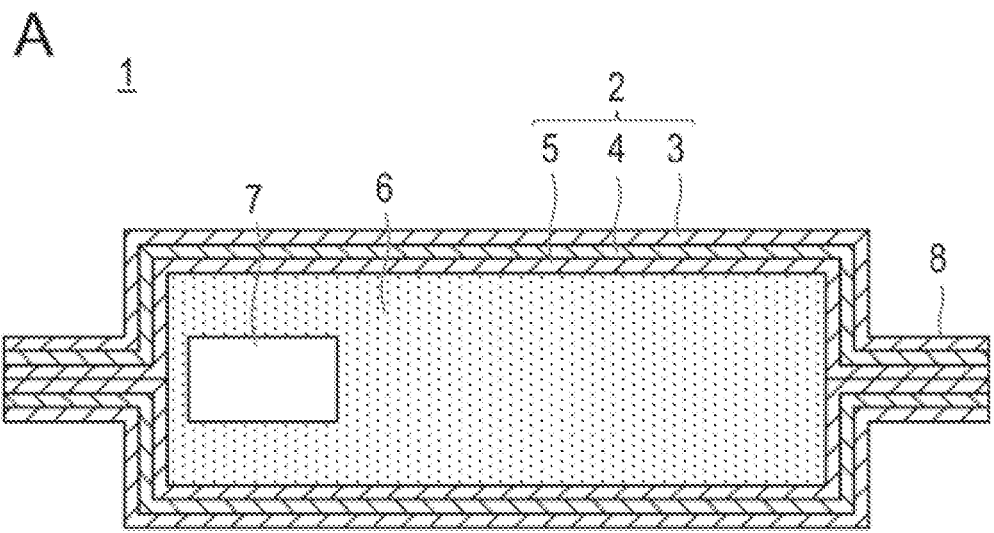
FIGS. 1A and 1B are a schematic cross-sectional view showing an embodiment of a vacuum insulation material.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The exterior gas barrier material of a vacuum insulation material may comprise a laminate comprising an aluminum foil and a polymer. Because aluminum has a high thermal conductivity, e.g., 237 W/m·K, the vacuum insulation material comprising the aluminum laminate as an exterior gas barrier material can form a heat bridge through which heat can inflow from peripheral parts. In order to reduce the heat bridge of the vacuum insulation material, a laminate comprising an aluminum deposition layer and a polymeric material can be used. In addition, in order to reduce thermal conductivity while maintaining gas barrier properties, a vacuum insulation material comprising a metal foil having low thermal conductivity, e.g., iron, lead, tin, or stainless steel, instead of an aluminum foil in a gas barrier layer can be used.

However, available laminates comprising an aluminum deposition layer and a polymeric material have insufficient gas barrier properties and thus may not sufficiently prevent gas invasion from the outside, and thus a vacuum inside the vacuum insulation material may not be maintained for a long time. Also, metal foils manufactured by compressing a metal foil of iron, lead, tin, stainless steel, and the like can be undesirably thick, e.g., 20 micrometers (μm) thick or more. Such thick metal foils may cause a large heat bridge and can have inferior workability due to their thickness, and may be rigid and difficult to handle when heat sealed parts are folded.

Disclosed is a vacuum insulation material which is capable of reducing heat bridging along the gas barrier material.

In another embodiment, a vacuum insulation material having improved gas barrier properties and/or workability is provided.

The disclosed vacuum insulation material comprises a copper alloy foil as an exterior gas barrier material.

Thus the problem of heat bridging in vacuum insulation materials may be solved by using a vacuum insulation material that includes a core material and a gas adsorption agent interposed between a pair of gas barrier materials having gas barrier properties, wherein the core material and the gas adsorption agent is sealed inside under a reduced pressure, and wherein at least one direction of the pair of gas barrier materials comprises a laminate comprising a copper alloy foil and a polymeric material.

According to an embodiment, the vacuum insulation material may effectively reduce heat bridging along the exterior gas barrier material. The vacuum insulation material has improved gas barrier properties and/or workability.

In an embodiment, a vacuum insulation material includes a core material and a gas adsorption agent interposed between a first gas barrier material and a second gas barrier material, each of which has gas barrier properties, wherein the core material and the gas adsorption agent are sealed inside the gas barrier materials under a reduced pressure, wherein at least one of the first and the second gas barrier materials includes a laminate comprising a copper alloy foil and a polymer. An embodiment comprises a copper alloy foil as the gas barrier material of the vacuum insulation material. The structure may effectively reduce heat bridging along the gas barrier material. While not wanting to be bound by theory, the following suggested mechanisms of the working effect of the vacuum insulation material are provided, but the disclosure shall not limited thereto.

In general, an exterior gas barrier material generally includes a laminate of a metal layer and a polymeric film having gas barrier properties, and a thickness of the metal layer may result in a heat bridge. Particularly, a thick metal layer is understood to form a significant heat bridge because a significant amount of heat can inflow from peripheral parts (e.g., surroundings) along the gas barrier material. In other words, a thickness of the metal layer and generation of the heat bridge have a positive relationship, i.e., are correlated. On the other hand, in the present embodiment, even if the copper alloy foil has a significantly reduced thickness, sufficient gas barrier properties may be provided, that is, a vacuum degree inside the vacuum insulation material may be maintained for a suitably long time. Thereby, the copper alloy foil may suppress heat that inflows from peripheral parts along the exterior gas barrier material. Therefore, the exterior gas barrier material according to the present embodiment may prevent, effectively suppress, or inhibit the heat bridge. Particularly, if the copper alloy foil is manufactured by electroplating, e.g., by using an electrodeposited copper foil or an electrodeposited metal foil), the thickness of the copper alloy foil may be further reduced (for example, to less than or equal to about 10 micrometers (μm), and the problems of the heat bridge may be more effectively suppressed or inhibited. In addition, since the electrodeposited foil is surface-micropolished, when compared with a rolled foil, close-contacting force may be further improved when being laminated with a polymeric film.

In general, a vacuum insulation material may be manufactured by including a core material and a gas adsorption agent between a first gas barrier material and a second gas barrier material, each of which has gas barrier properties, and sealing the core material and the gas adsorption agent inside under a reduced pressure, wherein terminal parts of the first and second gas barrier materials are bonded with each other to form a seal, e.g., a bonding part where the first and second gas barrier materials are bonded together to form the seal having a convex shape. The seal may be bent if desired, and for example, when a thickness of an exterior material is large, flexibility of a seal is poor, and thus it is difficult or impossible to bend the seal so that it can be closely attached to the main body of the vacuum insulation material. On the other hand, the copper alloy foil according to the present embodiment may be formed in a thin film shape, has improved gas barrier properties, and is a thin. Thereby, a seal comprising the disclosed gas barrier material may be bent to be adjacent the main body of the vacuum insulation material easily. Therefore, the vacuum insulation material according to the present embodiment has improved gas barrier properties and workability.

Therefore, the disclosed vacuum insulation material has low thermal conductivity, effectively suppresses generation of a heat bridge, and has improved gas barrier properties and workability. The vacuum insulation material according to the present embodiment may be applied to a refrigerator, a freezer, and the like, as a vacuum insulation material.

Hereinafter, examples are described. However, this disclosure is not limited to the following examples. In addition, for better understanding and the ease of description, the dimensional ratio is exaggerated in the drawings, and may be different from the actual ratio.

In the specification, the range of "X-Y" means greater than or equal to X and less than or equal to Y, "weight" and "mass", "wt %" and "mass %", and "parts by weight" and "parts by mass"] are considered as synonyms. Furthermore, unless defined otherwise, the operating and measuring properties and the like are performed under the conditions of room temperature of 20 to 25° C. and relative humidity of 40 to 50%.

(Vacuum Insulation Material)

Figure 1B:
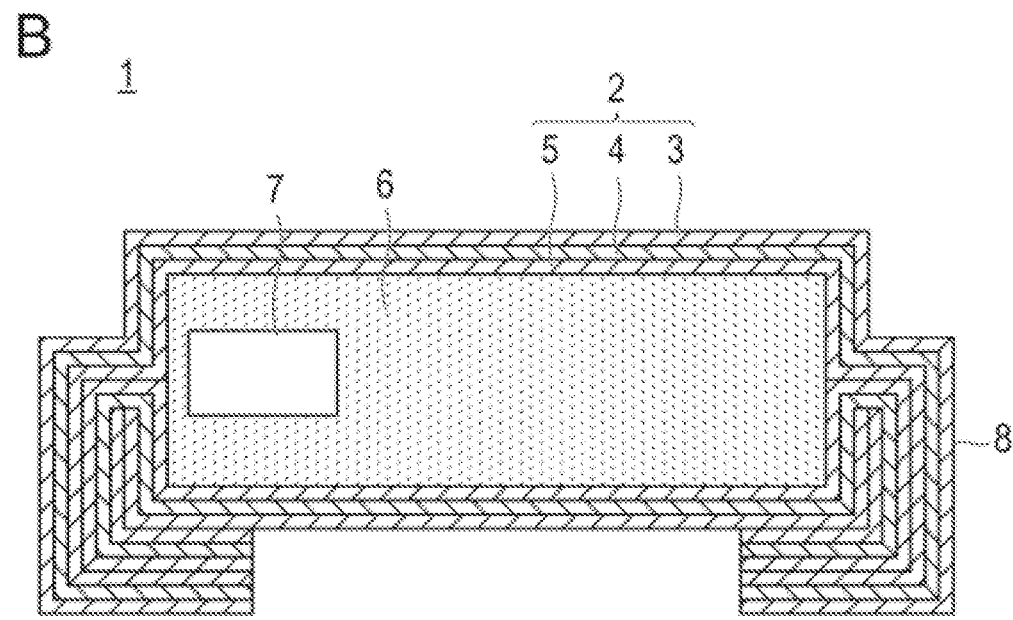

FIGS. 1A and 1B are a schematic cross-sectional view showing an embodiment of a vacuum insulation material.

As shown in FIG. 1A, the vacuum insulation material 1 has a structure in which a core material 6 and a gas adsorption agent 7 are interposed between two sheets of gas barrier materials 2, which are on an exterior of the vacuum insulation material. The gas barrier materials 2 may comprise a laminate having a stack structure, wherein the laminate comprises a metal foil 4 and first and second polymeric films 3 and 5, respectively. As is further disclosed above, the copper alloy foil provides improved gas barrier properties and has reduced thickness, and therefore may suppress heat bridging from peripheral parts along the gas barrier material 2. Thereby, the exterior material according to the present embodiment may efficiently suppress or inhibit heat bridging.

The vacuum insulation material 1 may be obtained by sealing, for example, heat sealing or ultrasonic sealing, the peripheral part of the gas barrier material to provide an envelope-shape accommodating the core material 6 and the gas adsorption agent 7 in the envelope of the gas barrier material 2, depressurizing the inside thereof, sealing, for example heat sealing, the opening. Thereby, as shown in FIGS. 1A and 1B, the peripheral part (e.g., terminal part) of the gas barrier material 2 has a seal 8 where the first and second gas barrier materials are attached to each other. The seal 8 may be folded to the side to be adjacent the main body of the vacuum insulation material to provide a vacuum insulation product, as shown in FIG. 1B. As described above, the gas barrier material comprising the copper alloy foil may be formed in a thin film shape, and have improved gas barrier properties, and have a reduced thickness, and the seal may be closely attached to the main body of the vacuum insulation material with ease. Therefore, in the present embodiment, even though the seal is bent, it may still effectively suppress or inhibit a heat bridge through which heat flows along the surface of the vacuum insulation material, and thereby the vacuum insulation material simultaneously has improved heat insulation performance, excellent gas barrier properties, and improved reliability.

A pressure within an envelope defined by the first and second gas barrier materials may be less than ambient pressure, and may be 0.001 to 1000 Pascals (Pa), or 0.01 to 100 Pa, or 0.05 to 10 Pa.

Hereinafter, each member of the vacuum insulation material is further disclosed. An embodiment includes a copper alloy foil as an exterior gas barrier material.

(Gas Barrier Material)

The gas barrier material includes a laminate of a copper alloy foil and a polymer. Herein, the vacuum insulation material may comprise, or consist of, two sheets of the gas barrier material, wherein at least one of the two sheets may include a laminate of a copper alloy foil and a polymer, or both sheets may include a laminate structure of a copper alloy foil and a polymer. In the former case, the gas barrier material that does not have the laminate structure of a copper alloy foil and a polymeric film is not particularly limited, and may be, for example: a metal foil of at least one of aluminum, iron, gold, silver, copper, nickel, SUS, tin, titanium, platinum, lead, cobalt, zinc, carbon steel, and the like, and/or an alloy foil comprising at least one of the foregoing metals; a deposition film of aluminum, nickel, cobalt, zinc, gold, silver, copper, silicon oxide, alumina, magnesium oxide, titanium oxide, and the like; and/or a laminate structure including an alloy deposition film comprising at least one of the foregoing metals, and a polymer.

In addition, although the metal foil 4 and the first and second polymeric films 3 and 5 are shown in FIGS. 1A and 1B as single layers, respectively, the copper alloy foil and polymeric film of the gas barrier material may be present as a single layer or in a laminate form having two or more layers, wherein each layer may be individually selected. In the latter case, the copper alloy foil and polymeric film may have a laminate structure comprising two or more layers. Further, the lamination of the copper alloy foil and polymeric film may have any form, and in an embodiment the outermost layer and the innermost layer thereof may be polymeric films to provide adhesion and surface protection effects. In other words, the gas barrier material may have a laminate form of a polymeric film-electrodeposited metal foil-polymeric film from the outside.

In the present embodiment, the copper alloy foil may be a single layer or may be a laminate of multiple layers, each of which may be individually selected. In addition, the composition of the copper alloy foil may not be particularly limited, and may be any suitable alloy foil including copper. Specifically, the copper alloy foil may comprise an alloy of copper and at least one selected from nickel, zinc, iron, aluminum, tin, lead, beryllium, cobalt, and manganese, and may comprise, for example, an alloy of copper and at least one selected from nickel, tin, and zinc, for example an alloy of copper and nickel. In an exemplary embodiment, the copper alloy foil may be an alloy foil including copper and nickel. A non-metal such as phosphorus, sulfur, or selenium may be further included if desired. Even though thermal conductivity of copper is high, it may be combined with a metal having low thermal conductivity as is further disclosed above, and thereby the thermal conductivity of the copper alloy foil may be reduced. On the other hand, the metal may be used singularly or as a combination of two or more kinds thereof.

A composition of the copper alloy is not particularly limited, and may be selected depending on desirable thermal conductivity and a type of a metal alloying with copper. For example, copper may be included in an amount of less than or equal to about 99 weight percent (wt %), for example less than or equal to about 90 wt %, relative to the electrodeposited metal foil (the total weight of metals constituting the metal foil). The lower limit of the copper composition is not particularly limited, but may be included in an amount of more than or equal to about 1 wt % relative to the electrodeposited metal foil (the total weight of metals constituting the metal foil). In the composition, the copper alloy foil may have sufficiently low thermal conductivity (i.e., improved heat insulation performance) and high gas barrier properties.

The thickness of the copper alloy foil is not particularly limited. However, the thickness (d) of the copper alloy foil may be, for example about 1 micrometer (μm) to about 10 μm, for another example about 3 μm to about 8 μm. When the thickness of the foil is less than about 1 μm, sufficient gas barrier properties may not be ensured. When it is greater than about 10 μm, thermal resistance is lowered and workability such as flexibility and the like may be weakened. The thin copper alloy foil has improved workability, and thus the seal of the gas barrier material may be easily closely attached to the main body of the vacuum insulation material. With the thin thickness, the exterior material may effectively suppress or inhibit a heat bridge through which heat flows along the surface of the vacuum insulation material, and thus improves heat insulation performance and gas barrier properties. In this specification, the thickness of the electrodeposited metal foil refers to a maximum thickness thereof.

The exterior material according to the present embodiment may have low thermal conductivity considering heat insulation performance. Therefore, the copper alloy foil may also have low thermal conductivity. For example, the copper alloy foil may have thermal conductivity (λ) of less than or equal to about 130 Watts per meter-Kelvin (W/m·K), for example less than or equal to about 100 W/m·K. When the thermal conductivity is greater than about 130 W/m·K, the heat bridge may not be sufficiently suppressed compared with a currently rolled aluminum foil. On the other hand, as the electrodeposited metal foil has lower thermal conductivity, it is better, and thus the lower limit is not particularly limited. However, in general, the thermal conductivity may be greater than or equal to about 10 W/m·K to be sufficient, or greater than or equal to about 20 W/m·K. The gas barrier material having such thermal conductivity may have improved heat insulation performance. The thermal conductivity of the copper alloy foil may be measured using a standard method, but in the present disclosure, the thermal conductivity of the copper alloy foil is measured as described in the following examples.

As described above, the gas barrier material according to the present embodiment may solve the problem of heat bridging by the gas barrier material. Considering suppression of the heat bridge, the gas barrier material may have a thin thickness and low thermal conductivity. Considering the above, it is desirable that the thermal resistance of copper alloy foil is high. For example, the copper alloy foil may have an absolute thermal resistance (R) of greater than or equal to about 750 Kelvin per Watt (K/W), for example greater than or equal to about 2000 K/W, for another example greater than or equal to about 3000 K/W. Further, since it is desirable that the thermal resistance of the electrodeposited metal foil is high, the upper limit is not particularly limited, and it may be generally less than or equal to about 15,000 K/W, for example less than or equal to about 10,000 K/W. The copper alloy foil may have an absolute thermal resistance of 750 K/W to 15,000 K/W, or 1500 K/W to 10,000 K/W. The vacuum insulation material comprising the copper alloy foil having thermal resistance of greater than or equal to about 750 K/W and a thickness of less than or equal to about 10 μm may effectively suppress or inhibit generation of a heat bridge, ensuring good workability compared with an aluminum foil. Herein, the thermal resistance refers to thickness-direction and vertical-direction thermal resistance for the metal foil per unit area. The absolute thermal resistance (R) (having the units K/W) may be calculated from the thickness (d) and the thermal conductivity (λ) of the copper alloy foil, and may be specifically calculated from the following Equation 1.

Absolute Thermal resistance of copper alloy foil $(K/W)=1\ (m)/[\text{thermal conductivity of copper alloy foil }(W/mK)\times 1\ (m)\times \text{thickness of copper alloy foil }(m)]$ (Equation 1)

The gas barrier material according to the present embodiment may desirably have excellent gas barrier properties. Therefore, it is desirable for the copper alloy foil to also have excellent gas barrier properties. For example, the copper alloy foil may have vapor permeability of less than or equal to about $1\times 10^{-3}$ grams per square meter per day (g/m²·day), for example less than or equal to about $5\times 10^{-4}$ g/m²·day. When the vapor permeability is greater than about $1\times 10^{-3}$ g/m²·day, the gas barrier properties of the gas barrier material may be insufficient and the vacuum degree inside the vacuum insulation material may not be maintained for a suitable time. Further, as lower vapor permeability of the metal foil is better, the lower limit thereof is not particularly limited, but may be generally greater than or equal to about $1\times 10^{-7}$ g/m²·day.

The method of manufacturing the copper alloy foil is not particularly limited, and may include an alloying treatment by a suitable heat treatment. Preferably, (a) heating (alloying) treatment after laminating a metal on one side or both sides of a copper foil, (b) heating (alloying) treatment after laminating copper on one side or both sides of a metal foil, or (c) shaping a thin film after preparing a copper alloy having a desirable composition by alloying treatment may be used. Among them, for example, the (a) or (b) method may be applied. The copper alloy foil may be manufactured by laminating a metal on at least one side of the copper foil or by laminating copper on at least one side of a metal foil, and then using an alloying process by heat treatment. Hereinafter, the preferable embodiments are described, but the present disclosure is not limited thereto.

In the (a), a copper foil may be an electrodeposited copper foil; or in the (b), a metal foil may be an electrodeposited metal foil. In other words, the copper foil may be an electrodeposited copper foil, or the metal foil may be an electrodeposited metal foil. Since the electrodeposited copper foil or the electrodeposited metal foil formed through electrodeposition may be formed to be thin as well as to provide suitable gas barrier properties, the thickness of the foil may be decreased. Thus, a copper alloy foil manufactured using the electrodeposited copper foil or the electrodeposited metal foil may suppress heat inflow along the gas barrier material. Accordingly, a gas barrier material comprising the copper alloy foil may efficiently suppress or inhibit a heat bridge of a vacuum insulation material. In addition, for the same reason, since the exterior material is thin, the exterior material has improved workability (e.g., flexibility), is easily bent at the seal that may hinder urethane sealing, and is closely attached to the main body of the vacuum insulation material. Herein, a method of manufacturing the electrodeposited copper foil/electrodeposited metal foil has no particular limit, but may include a method of electrodepositing copper/metal in a revolving drum. In the (b), the metal foil may be formed of a single type of metal, or of a mixture or an alloy of two or more metals.

Alternatively, the electrodeposited copper foil/electrodeposited metal foil may be commercially obtained.

A method of manufacturing a metal foil is in general classified into a rolling method of repeatedly rolling and annealing an electroplated metal (for example, electroplated copper) into a thin film, and the electrodeposition method. Whether the copper alloy foil is manufactured in the rolling method or electrodeposition method may be examined hereinafter. A copper alloy foil manufactured in the electrodeposition method has dense particles, and the particles grow in a thickness direction, while a copper alloy foil manufactured in the rolling method has large particles, and the particles are elongated in a plane direction through a rolling operation. In addition, the electrodeposited foil shows high surface roughness compared with the rolled foil due to the manufacturing process. For example, the electrodeposited foil has surface roughness (Rz) ranging from about 0.1 μm to about 3 μm, specifically, from about 0.5 μm to about 2.5 μm, and more specifically, from about 0.7 μm to about 2 μm.

In the (a) and (b), metal or copper may be laminated on at least one side of the copper foil or the metal foil or on both sides thereof. Accordingly, since an alloying treatment following the lamination is more uniformly performed in a thickness direction of the copper foil or the metal foil, uniformity of a copper alloy foil composition may be improved. On the other hand, the copper alloy foil may be thin, for example, may have a thickness sum of the copper foil and the metal foil in the (a) and (b) of less than or equal to about 10 μm considering suppression of the heat bridge, workability, or the like as described above. In addition, the copper foil may be used in an amount of less than or equal to about 99 wt %, for example, less than or equal to about 90 wt %, relative to the amount of the metal foil in terms of manufacture ease, cost, and the like.

The method of laminating metal or copper in the copper foil or the metal foil is not particularly limited. For example, the method may include electroplating and the like, and the electroplating may be used considering thinness of the copper alloy foil and the like. The lamination may be performed once or repeatedly. Accordingly, the lamination may be performed in any way of (A) laminating one kind of metal or a mixture of two or more metals on the copper foil, (B) laminating copper on the metal foil formed of one metal or two or more metals, (C) repeating the process of the (A) and/or (B), (D) combining the processes (A) to (C), and the like.

A heat-treatment (e.g., alloying) after the lamination of metal or copper on the copper foil or the metal foil has no particular limit, but may be performed under any suitable conditions of sufficiently alloying them. For example, the heat-treatment (alloying) may be performed at about 400° C. to about 1000° C., for example, about 600° C. to about 900° C. When the heat-treatment is performed at a lower temperature of below about 400° C., the temperature is too low to perform sufficient alloying. When the temperature is higher than about 1000° C., which is around the melting point, the film may not be alloyed while it maintains a thin film shape. Under the above condition, the copper foil or metal foil may be sufficiently alloyed with a metal or copper and be efficiently manufactured into a copper alloy foil having a desired composition. The heat-treatment (alloying) may be performed under any atmosphere but under a reduction or vacuum or inert gas (for example, nitrogen gas, argon gas, helium gas, hydrogen gas, ammonia gas and the like) atmosphere to prevent oxidation of the metal surface.

The copper alloy foil may be laminated with a polymeric film to provide an exterior material. Herein, the polymeric film may be one layer or a laminate of two or more kinds thereof. The composition of the polymeric film may not be particularly limited, but generally, the polymeric film (e.g., second polymeric film 5 in FIGS. 1A and 1B) at the inner side (the side accommodating the core material or the gas adsorption agent) from the copper alloy foil may be a film having thermal bonding properties, and the polymeric film (first polymeric film 3 in FIGS. 1A and 1B) at the outside (the side contacting the exterior atmosphere) from the metal foil may be a film having a surface protective effect (surface protective film).

Herein, second polymeric film 5, i.e., the thermal bonding film, is not particularly limited as long as it may be adhered by a general sealing method (for example, a heat sealing or an ultrasonic sealing method). The material of the thermal bonding film may be, for example, a polyolefin such as low density polyethylene, linear low density polyethylene, high density polyethylene, polypropylene, and the like, a thermoplastic resin such as an ethylene-vinyl acetate copolymer, an ethylene-methacrylic acid copolymer, an ethylene-acrylic acid ester copolymer, an ethylene-methacrylic acid ester copolymer, a polyacrylonitrile, and the like. The material may be used singularly or as a combination comprising at least one of the foregoing. The thermal bonding film may be a single layer or a laminate of two or more layers. In the case of the latter, each layer may have the same composition or different compositions.

The thickness of the thermal bonding film is not particularly limited. For example, the thermal bonding film may have a thickness of about 10 μm to about 100 μm. When it is thinner than about 10 μm, the contact strength may be insufficient on the heat seal, and when is thicker than about 100 μm, the workability such as flexibility may be deteriorated. When the thermal bonding film has a laminate structure of two or more layers, the thickness of the thermal bonding film means the total thickness. The thickness of each layer may be the same or different in this case.

The first polymeric film 3, i.e., surface protective film, is not particularly limited, and may be a material used as the surface protective film of the gas barrier material. The material of the surface protective film may be, for example, a polyamide (nylon) ("PA") such as nylon-6, nylon-66, and the like, a polyester such as polyethylene terephthalate ("PET"), polyethylene naphthalate ("PEN"), polybutylene terephthalate ("PBT"), and the like, a polyolefin such as polyethylene ("PE"), polypropylene ("PP"), polystyrene ("PS"), and the like, polyimide, polyacrylate, polyvinyl chloride ("PVC"), polyvinylidene chloride ("PVDC"), an ethylene vinyl alcohol copolymer ("EVOH"), a polyvinyl alcohol resin ("PVA"), polycarbonate ("PC"), polyether sulfone ("PES"), polymethyl methacrylate ("PMMA"), polyacrylonitrile resin ("PAN"), and the like. These films may include several additives or stabilizers, for example, an antistatic agent, an ultraviolet ("UV") blocking agent, a plasticizer, a lubricant, or the like. The material may be used singularly or as a combination comprising at least one of the foregoing. The surface protective film may be a single layer or a laminate of two or more layers. In the latter case, each layer may have the same composition or a different composition.

The thickness of the surface protective film is not particularly limited. For example, the surface protective film may have a thickness ranging from about 10 μm to about 100 μm. When it is less than about 10 μm, the barrier layer is not sufficiently protected and cracks and the like may be generated. When it is greater than about 100 μm, the workability such as flexibility may be deteriorated like the thermal bonding film. When the surface protective film has a laminate structure of two or more layers, the thickness of the laminate means the total thickness. The thickness of each layer may be the same or different in this case.

The thickness of the gas barrier material is not particularly limited. For example, the thickness of the exterior material may be about 20 µm to about 210 µm. The gas barrier material may suppress or inhibit a heat bridge more effectively and improve heat insulation performance, and further improve gas barrier properties and workability.

The gas barrier material may have low thermal conductivity considering heat insulation performance. Accordingly, a vacuum insulation material comprising the gas barrier material may also have low thermal conductivity. For example, the vacuum insulation material may have a thermal conductivity ($\lambda$) of less than or equal to about 0.01 W/m·K, or for example, less than or equal to about 0.005 W/m·K. The vacuum insulation material having the above thermal conductivity may have excellent heat insulation performance. On the other hand, since the lower thermal conductivity is more advantageous, the vacuum insulation material has no particular limit to a lowest thermal conductivity, but the thermal conductivity may be greater than or equal to about 0.0005 W/m·K. The thermal conductivity of the vacuum insulation material may be measured by a standard method, and the thermal conductivity of the vacuum insulation material is measured in a method described in the following examples.

The method of manufacturing a vacuum insulation material is not particularly limited, and may include any suitable method or appropriately modified methods. For example, the method may include: (i) preparing two sheets of gas barrier materials, folding one of the gas barrier materials (laminate film) and heat bonding between thermal bonding films disposed in the terminal ends of gas barrier materials facing each other to provide an envelope-shaped gas barrier material, injecting a core material and a gas adsorption agent into the envelope, and heat bonding between the thermal bonding films disposed in the opening of the envelope-shaped laminate film under the reduced pressure; or (ii) disposing two sheets of gas barrier materials (laminate films) to face the thermal bonding films to each other, heat bonding between the thermal bonding films disposed in the terminal ends of each exterior material to provide an envelope-shaped gas barrier material, injecting a core material and a gas adsorption agent into the envelope, and heat bonding between the thermal bonding films disposed around the opening of the envelope-shaped gas barrier material under the reduced pressure.

(Core Material)

The core material used in the present embodiment becomes a support structure of a vacuum insulation material to provide a vacuum space. Herein, the core material is not particularly limited, and may include any suitable core material. For example, the core material may include: an inorganic fiber such as glass wool, rock wool, an alumina fiber, a metal fiber formed of a metal having low thermal conductivity, and the like; an organic fiber such as a synthetic fiber like polyester or polyamide, acrylic fiber, polyolefin, and the like, a cellulose manufactured from wood pulp; a natural fiber such as cotton, hemp, wool, silk, and the like; a recycled fiber such as rayon and the like; a semi-synthetic fiber such as acetate and the like; and the like. The core materials may be used alone or as a combination comprising at least one of the foregoing. Among these materials, glass wool is specifically mentioned. The core material formed of these materials has high elasticity and low thermal conductivity of the fiber itself, and a low cost for industrial use.

(Gas Adsorption Agent)

The gas adsorption agent according to the present embodiment adsorbs gasses such as vapor or air (oxygen and nitrogen) remaining in or entering the closely sealed spaced of the vacuum insulation material. The gas adsorption agent is not particularly limited, and may include any suitable gas adsorption agents. For example, the gas adsorption agent may include a chemical adsorption material such as calcium oxide (quick lime) and magnesium oxide, a physical adsorption material such as zeolite, open-cell polyurethane, a lithium compound, a chemical adsorptive and physical adsorptive copper ion exchange ZSM-5 type of zeolite, molecular sieve 13×, or the like. The gas adsorption agent material may be used singularly or as a combination comprising at least one of the foregoing.

As is further disclosed above, the vacuum insulation material has low thermal conductivity, effectively suppresses generation of a heat bridge, and also has improved gas barrier properties and workability. Accordingly, the vacuum insulation material may be appropriately employed to maintain the heat insulation performance, for example, in a freezer, a refrigerator, a vending machine, a hot water supply, a heat insulation material for a building, a heat insulation material for an automobile, a thermostatic box, or the like.

EXAMPLES

The effects of the embodiments are further described referring to the following examples and comparative examples. However, technical scope of the present disclosure is not limited to the following examples. In addition, the operation is performed at room temperature of 25° C. unless mentioned otherwise. Also, unless mentioned otherwise, "%" and "part" each refers to "wt %" and "parts by weight."

Example 1

Nickel is electroplated on an electrodeposited copper foil to have a copper ratio of 90 wt %, obtaining a 10 µm-thick copper-nickel laminate foil. Then, the copper-nickel laminate foil is heat-treated at 800° C. for 60 minutes under a $N_2$ atmosphere, manufacturing a copper-nickel alloy foil 1.

Example 2

A copper-nickel foil 2 is manufactured according to the same method as Example 1, except for changing the copper ratio to 80 wt % in the copper-nickel laminate foil.

Example 3

A copper-nickel foil 3 is manufactured according to the same method as Example 2, except for changing the thickness of the copper-nickel laminate foil to 8 µm.

Example 4

A copper-nickel foil 4 is manufactured according to the same method as Example 1, except for electroplating nickel to have a copper ratio of 55 wt %.

Example 5

A copper-zinc foil 1 is manufactured according to the same method as Example 1, except for electroplating zinc on an electrodeposited copper foil to have a copper ratio of 65 wt %.

Comparative Example 1

A rolled aluminum foil (7 μm) is used.

Comparative Example 2

Vacuum metallized polyethylene terephthalate ("VM-PET") including a 50 nm-thick Al deposition film formed on a 12 μm-thick polyethylene terephthalate is used.

Comparative Example 3

A rolled SUS (stainless steel) foil (20 μm) is used.

The manufactured metal foils and the VM-PET are evaluated as follows.

Evaluation 1: Vapor Permeability

Vapor permeability (g/m²·day) of the metal foils and VM-PET according to Examples 1 to 5 and Comparative Examples 1 to 3 is measured in the following method. That is, the vapor permeability is measured at 40° C. under relative humidity of 90% RH by using Aquatran equipment (MOCON Inc.) with reference to ISO 15106-3. The results are provided in the following Table 1.

Likewise, flexibility of the metal foils and VM-PET according to Examples 1 to 5 and Comparative Examples 1 to 3 is evaluated by respectively overlapping two sheets of the foils having A4 size each, and then folding four times to 30 mm in from the edge The flexibility is evaluated as follows.

When four folded times:

◯: adhered without a curved part with a bent track coming up from the folding, and having no damage at the folded part.

x: other than the above.

The results are provided in the following Table 1.

TABLE 1

| Metal foil | Vapor permeability (g/m² day) | Flexibility |
| --- | --- | --- |
| Example 1 | copper-nickel foil 1 | <5 × 10⁻⁴ | ◯ |
| Example 2 | copper-nickel foil 2 | <5 × 10⁻⁴ | ◯ |
| Example 3 | copper-nickel foil 3 | <5 × 10⁻⁴ | ◯ |
| Example 4 | copper-nickel foil 4 | <5 × 10⁻⁴ | ◯ |
| Example 5 | copper-zinc foil 1 | <5 × 10⁻⁴ | ◯ |
| Comparative Example 1 | rolled aluminum film | <5 × 10⁻⁴ | ◯ |
| Comparative Example 2 | VM-PET | 4 × 10⁻² | ◯ |
| Comparative Example 3 | rolled SUS foil | <5 × 10⁻⁴ | x |

As shown in Table 1, Comparative Example 2 using an aluminum deposition film as a gas barrier layer shows high vapor permeability and deteriorated gas barrier properties compared with Examples 1 to 5 and Comparative Examples 1 and 3 using other metal foils. In addition, when the rolled SUS foil is used, insufficient flexibility and deteriorated workability are found.

Evaluation 2: Thermal Conductivity and Thermal Resistance of Copper Alloy Foil

Thermal diffusivity of the metal foils of Examples 1 to 5 and Comparative Example 1 in an internal plane direction of the copper alloy foil is measured by using Thermowave Analyzer (Nissan ARC) and used with specific heat and density of each copper alloy foil to calculate thermal conductivity (W/m·K). In addition, the obtained thermal conductivity and thicknesses of the copper alloy foil are used to calculate thermal resistance (K/W). The results are provided in the following Table 2.

Evaluation 3: Effective Thermal Conductivity of Vacuum Insulation Material

Effective thermal conductivity (i.e., average thermal conductivity all over a vacuum insulation material) of the metal foils according to Examples 1 to 5 and Comparative Example 1 is calculated based on the method disclosed in M. Tenpierik and H. Cauberg, Journal of Building Physics, Vol. 30, No. 3-January 2007, the content of which is incorporated herein by reference in its entirety, and thermal conductivity and thickness of each metal foil when the vacuum insulation material (290 mm×410 mm×6 mm) has thermal conductivity of 1 mW/m·K in the middle part, and a heat bridge of the vacuum insulation material is evaluated. The results are provided in the following Table 2.

As shown in the following Table 2, a copper alloy foil according to the present embodiment may improve thermal resistance and suppress an influence of a heat bridge compared with a conventional rolled aluminum foil as a barrier layer of a vacuum insulation material, and thus shows excellent heat insulation performance.

TABLE 2

| | Metal foil | Thickness (μm) | Thermal conductivity of metal foil (W/mK) | Thermal resistance of metal foil (K/W) | Effective thermal conductivity of vacuum insulation material (mW/mK) |
| --- | --- | --- | --- | --- | --- |
| Ex 1 | Cu—Ni foil 1 | 10 | 59 | 1695 | 3.0 |
| Ex 2 | Cu—Ni foil 2 | 10 | 35.2 | 2841 | 2.4 |
| Ex 3 | Cu—Ni foil 3 | 8 | 35.2 | 3551 | 2.2 |
| Ex 4 | Cu—Ni foil 4 | 8 | 23 | 5435 | 1.9 |
| Ex 5 | Cu—Zn foil 1 | 10 | 113 | 885 | 3.7 |
| CEx 1 | rolled Al foil | 7 | 237 | 603 | 4.9 |

In the tables, Ex means Example, CEx means Comparative Example.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vacuum insulation material comprising:
   a core material and a gas adsorption agent interposed between a first gas barrier material and a second gas barrier material,
   wherein the first and the second gas barrier materials sealingly enclose the core material and the gas adsorption agent,
   wherein at least one of the first and the second gas barrier materials comprises a laminate comprising a copper alloy foil and a polymeric material, and
   wherein the copper alloy foil is an alloy comprising at least copper, and further comprising at least one of nickel, tin, zinc, and combination thereof.

2. The vacuum insulation material of claim 1, wherein the copper alloy foil has an absolute thermal resistance of greater than or equal to about 750 Kelvin per Watt.

3. The vacuum insulation material of claim 2, wherein the copper alloy foil has a thickness of about 1 micrometer to about 10 micrometers.

4. The vacuum insulation material of claim 1, wherein the copper alloy foil is a product of laminating a metal on at least one side of a copper foil or laminating copper on at least one side of a metal foil, and then alloying the same by heat-treatment.

5. The vacuum insulation material of claim 4, wherein the copper foil is an electrodeposited copper foil or the metal foil is an electrodeposited metal foil.

6. The vacuum insulation material of claim 1, wherein the copper alloy foil is an alloy comprising copper and nickel.

7. The vacuum insulation material of claim 1, where a pressure in an envelope defined by the first and second gas barrier materials is less than ambient pressure.

* * * * *